Oct. 26, 1954  D. J. PEEPS  2,692,655
AIR CLEANER
Filed Dec. 28, 1951  2 Sheets-Sheet 1
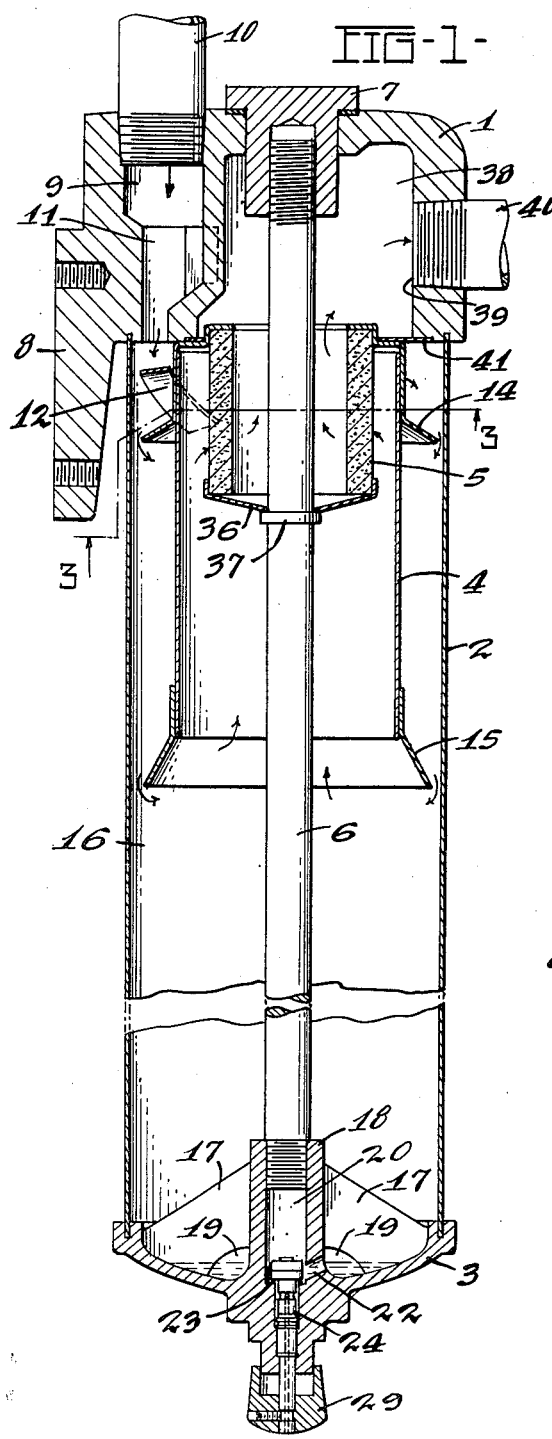
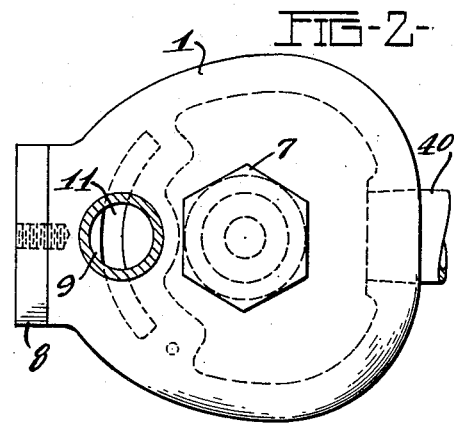
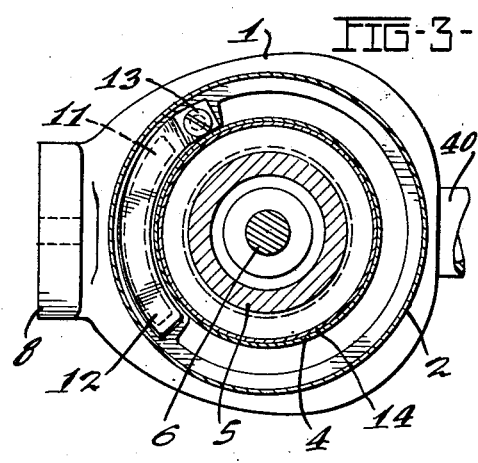
INVENTOR:
DONALD J. PEEPS.
BY
W. P. Carr
ATTY.

Oct. 26, 1954     D. J. PEEPS     2,692,655
AIR CLEANER
Filed Dec. 28, 1951     2 Sheets-Sheet 2
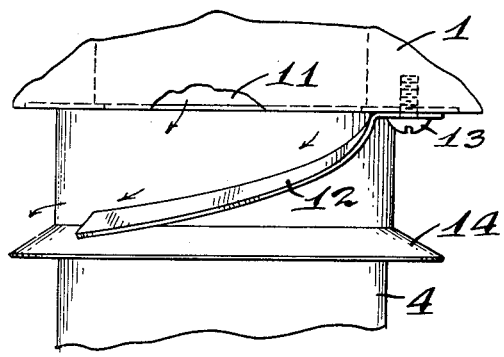
FIG-4-
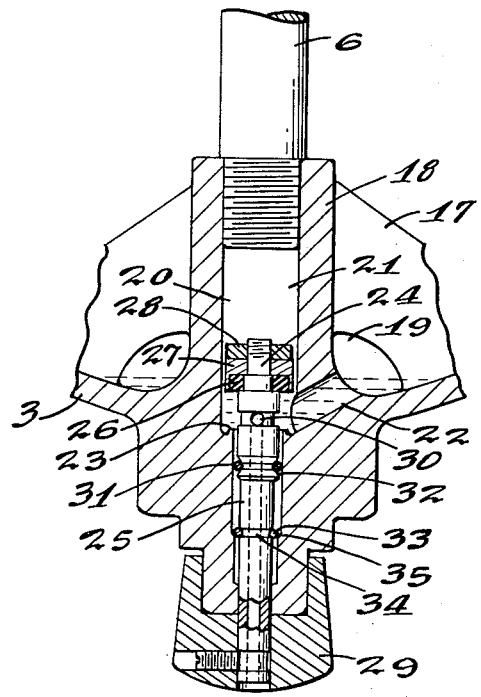
FIG-6-
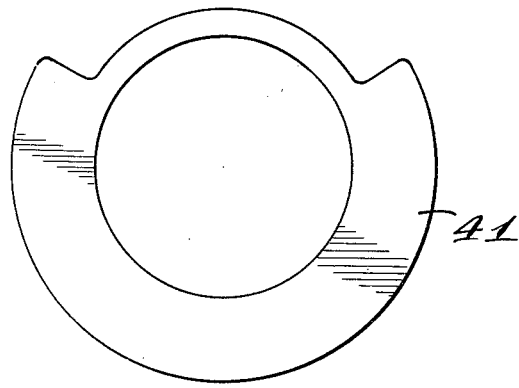
FIG-5-
INVENTOR:
DONALD J. PEEPS.
BY
W. P. Carr
ATTY.

Patented Oct. 26, 1954

2,692,655

UNITED STATES PATENT OFFICE 2,692,655

AIR CLEANER

Donald J. Peeps, Toledo, Ohio, assignor to The De Vilbiss Company, Toledo, Ohio, a corporation of Ohio Application December 28, 1951, Serial No. 263,840

2 Claims. (Cl. 183—81)

This invention relates to an air cleaner for compressed air and specifically to such a cleaner with means for removing entrained moisture from the air.

For many industrial purposes and particularly in regard to paint spraying operations, it is very desirable that compressed air be free of moisture, oil and dirt particles. Should such foreign matter be combined with a spray-deposited coating not only is the appearance adversely affected but also the protective nature of the coating may be severely impaired. As water of condensation is most apt to be present in compressed air to an undesirable degree air cleaners for spray painting purposes are designed particularly to remove this material.

One object of the invention is the provision of an efficient air cleaning device having a simplified inexpensive compact design. Another object is the provision in such an air cleaner of easily manipulated means for the discharge therefrom of any accumulated water.

A feature of the invention contributing to the accomplishment of the objects is the small part by which the air is given a whirling motion. This is a short curving blade as compared to extended curving surfaces usually used in prior devices. The invention is further characterized by the limited number and simplicity of the baffles through which restriction and expansion of the air stream is secured. Another feature is the axially movable drain valve for drainage of material removed from the air.

Other objects and advantages will become apparent with the reading of the following description with reference given the accompanying drawings.

In the drawings:

Figure 1 is a vertical section of an air cleaner embodying my invention;

Figure 2 is a plan view thereof;

Figure 3 is a horizontal section taken on the line 3—3 of Figure 1;

Figure 4 is an enlarged fragmentary elevation showing the curving blade directing the air in a spiral path and the upper portion of the inner tubular member;

Figure 5 is a plan view of the flat sealing ring; and

Figure 6 is an enlarged vertical section of the drain valve components.

As shown in the drawings the air cleaner here presented includes a head member 1 formed from a casting. Depending from the head member is a tubular casing 2 on the lower end of which is a closure cap 3.

Concentrically positioned within the casing is tubular partitioning member 4 and within the latter is the filter cylinder 5. These various elements are held in assembled relation by a tie rod 6 threaded at its lower end to the closure cap 3 and at its upper end to a nut 7 inserted into the head 1. Integral with the head is a flat faced mounting pad 8 by which the air cleaner may be secured in any desired location.

There is an air inlet passage 9 in the head which is threaded at its top portion to receive an air supply pipe 10. The passage 9 terminates on the lower side of the head 1 in an elongated arcuate port 11. Beneath this port is a vertically thin air directing blade 12. This blade is secured at one end by a screw 13 to the underside of the head 1 just beyond one end of the port 11 and slopes downwardly below the port 11. The blade is sufficiently wide to quite completely bridge the space between the tubular casing 2 and the partitioning member 4 and extends downwardly until its lower end is closely adjacent to the upper surface of the outwardly extending annular flange 14 which is integral with the partitioning member 4. The positioning of the blade is shown in Figure 4. The flange 14 extends sufficiently close to the inner surface of the casing 2 to leave only a narrow restricted annular opening therebetween.

Air flowing through air inlet passage 9 is forced by the blade 12 to travel in a circular path around the partitioning member 4 while progressively moving downwardly in a spiral path through the limited opening between the edge of the flange 14 and the casing 2. The air continues its spiral travel past a second baffling flange 15 projecting outwardly from the lower end of the partitioning member 4.

Beneath flange 15 the air expands in space 16 as it turns upwardly into the partitioning member 4. The whirling action of the air as it travels downwardly between the casing 2 and the partitioning member 4 throws entrained particles of water, oil and dirt by centrifugal action against the inner surface of the casing.

The expansion of the air in space 16 also releases such entrained particles. The water with other matter deposited upon the casing wall flows downwardly into the well formed by the inner contour of the closure cap 3 and is joined there by particles precipitated by the expansion of the air in space 16.

For the purpose of strengthening the cap casting 3 there are vertical webs 17 between its periphery and the center stud 18. Adjacent the stud in the lower portion of the webs are apertures 19 which permit accumulated liquid to pass freely through the webs around the stud.

On the vertical axis of the cap 3 and through its center stud 18 is a bore 20. This has an enlarged upper portion 21 in which the tie rod 6 is threadedly engaged.

Through the base of the stud providing communication between the interior water collecting well in the cap and the lower end of the enlarged portion of the axial bore is passage 22. On the shoulder at the bottom of the enlarged bore is an annular ridge providing a valve seat 23. A drain valve assembly 24 including a tubular valve stem 25 is fitted into the bore for longitudinal movement.

As may be seen by reference to Figures 1 and 6, particularly the latter, the valve assembly has a resilient valve member 26 within a retainer 27 held on the upper closed end of the tubular valve stem 25 by a nut 28. The valve member 26 is designed to have sealing contact with valve seat 23. On the lower exteriorly extending end of the valve stem is fastened a finger knob 29 for moving the drain valve into open or closed position. On the valve stem below the resilient valve member is a lateral port 30 for the passage of water into the interior of the stem and downwardly into the atmosphere. The water is forced therethrough by the air pressure within the air cleaner when the valve is pushed into raised open position with the valve member 26 moved upwardly from the seat 23.

To prevent leakage of water along the outside of the valve stem an O-ring packing 31 is carried in a peripheral groove 32 on the stem. To frictionally retain the valve in open position a split ring 33 held in a second groove 34 on the stem expands over the shoulder 35 in the bore. After the valve is manually returned to closed position it is held there by the air pressure within the air cleaner as well as by the tension of split ring 33.

The air with most of the entrained particles left behind moves upwardly within the partitioning member 4. At the top of member 4 the air turns radially inwardly through the filter cylinder 5.

The filter cylinder is a well known commercial type formed of layers of corrugated paper rings bound together by a phenolic resin. The great number of openings provided by the corrugations presents little restriction to the air flow while the openings are sufficiently small to stop any fine particles still carried by the air.

The cylinder 5 is held in place against the inwardly flanged upper end of member 4 by a retaining disc 36 which also closes the lower end of the cylinder. The disc in turn is supported by split ring 37 mounted in a groove in tie rod 6.

The air continues through the open upper end of the filter cylinder into chamber 38 within head 1 and thence through outlet 39 to the point of use. A portion of a delivery pipe 40 is shown threaded into outlet 39. The disc 36 is constructed with sufficient vertical give to permit firm sealing between the filter cylinder and the flanged upper end of member 4, and between the latter and the head, when the rod is threadedly engaged by nut 7 and cap 3. As the opening in the underside of the head 1 below chamber 38 is non-circular it is necessary to insert a ring 41 (Fig. 5) between the member 4 and the head to seal the air entering space between casing 1 and member 4 from the outlet chamber 38.

As may be perceived from the foregoing there has been provided an air cleaner with a minimum number of parts but with high capacity. A great quantity of air may be handled due to the limited restriction to the air flow. The path for the air is of ample proportions with the intervention of only two baffles to assist in the removal of water. With the combination of centrifugal and expansion action the removal of extraneous matter is effectively accomplished even with a high rate of air travel. The important whirling action is obtained through the single plain blade element as compared to the usually involved spiral structure.

The assembly of the main components is accomplished through the tie rod thus simplifying manufacturing and maintenance procedure. With a slidable drain valve, discharge of accumulated water is easily handled and whether the valve is in opened or closed position may be quickly observed.

The specific structure of the drain valve is the subject of a copending application, entitled Drain Valve for an Air Cleaner, Serial No. 437,525, filed June 17, 1954.

It should be understood that this invention is not limited to any specific construction as it is capable of embodiment in various forms within the spirit of the claims.

What I claim is:

1. In an air cleaner, a hollow head member having an air inlet and an air outlet, a tubular casing extending downwardly from the head member, a bottom cap closing the lower end of the casing, a tubular member concentrically positioned within the casing with its upper end set against the head member, the air inlet communicating with the space between the casing and the tubular member and the air outlet having communication with the upper end of the tubular member, an outwardly extending peripheral flange near the upper end of the tubular member, the outer edge of the flange spaced slightly from the inner wall of the casing and defining therewith a narrow annular passage for the air, and a short flat blade fastened at its upper end to the lower side of the head member, otherwise unattached, extending downwardly below the air inlet, laterally bridging the space between the casing and the tubular member, and with its lower end terminating closely adjacent to the upper side of the flange whereby the air from the inlet opening is directed in a circumferential path toward the narrow annular passage between the outer edge of the flange and the inner wall of the casing.

2. An air cleaner as set forth in claim 1 having a tie rod extending from the head member to the bottom cap and holding the head member, the casing, the tubular member, and bottom cap in assembled relation.

References Cited in the file of this patent

UNITED STATES PATENTS

| Number | Name | Date |
| --- | --- | --- |
| 1,107,485 | Bowser | Aug. 18, 1914 |
| 1,606,749 | Clark et al. | Nov. 16, 1926 |
| 1,857,887 | Stein | May 10, 1932 |
| 1,867,465 | Moynan | July 12, 1932 |
| 2,585,045 | Schmidlin | Feb. 12, 1952 |

FOREIGN PATENTS

| Number | Country | Date |
| --- | --- | --- |
| 416,391 | Germany | July 16, 1925 |
| 467,810 | Germany | Nov. 1, 1928 |